United States Patent [19]

Cadwell

[11] Patent Number: 5,607,638
[45] Date of Patent: Mar. 4, 1997

[54] VACUUM SIZING APPARATUS AND METHOD OF USING SAME

[76] Inventor: Charles E. Cadwell, 159 Paramount Dr., Wood Dale, Ill. 60191

[21] Appl. No.: 465,914

[22] Filed: Jun. 6, 1995

[51] Int. Cl.[6] ............................. B29C 47/90
[52] U.S. Cl. ................. 264/560; 264/562; 264/568; 264/178 R; 264/209.4; 264/177.19; 425/71; 425/325; 425/388
[58] Field of Search ................. 264/568, 209.4, 264/560, 562, 178 R, 177.19; 425/325, 388, 326.1, 379.1, 71

[56] References Cited

U.S. PATENT DOCUMENTS

| | | | |
|---|---|---|---|
| 3,182,108 | 5/1965 | Branscum . | |
| 3,804,567 | 4/1974 | Rechnagel | 425/71 |
| 3,804,574 | 4/1974 | Gatto | 425/388 |
| 3,821,349 | 6/1974 | Mozer . | |
| 3,993,726 | 11/1976 | Moyer . | |
| 4,020,136 | 4/1977 | Zaro | 264/568 |
| 4,181,487 | 12/1977 | Kessler . | |
| 4,287,151 | 9/1981 | Esakov et al. . | |
| 4,352,771 | 10/1982 | Szabo | 425/325 |
| 4,401,424 | 8/1983 | DeZen | 425/388 |
| 4,411,613 | 10/1983 | Gauchel et al. . | |
| 4,530,650 | 7/1985 | Milani | 425/325 |
| 5,008,051 | 4/1991 | DeCoursey et al. . | |
| 5,082,613 | 1/1992 | Kasakevich et al. . | |
| 5,288,218 | 2/1994 | Melkonian | 264/209.4 |
| 5,316,459 | 5/1994 | Melkonian et al. | 264/209.4 |
| 5,340,295 | 8/1994 | Preiato et al. . | |
| 5,464,335 | 11/1995 | Bessemer et al. | 425/71 |
| 5,468,442 | 11/1995 | Brambilla | 264/568 |
| 5,480,295 | 1/1996 | Greve | 264/562 |

FOREIGN PATENT DOCUMENTS 1911223  9/1970  Germany ........................ 425/71

OTHER PUBLICATIONS

Island Machinery Catalog of Model DPC-204-4-12.
Conair Gatto Catalog entitled, "Differential Pressure Calibrators".
Conair Gatto Catalog entitled, "Spray & Water Tanks".
Conair Gatto Catalog entitled, "High Technology Differential Pressure Calibrator".
Conair Gatto Catalog entitled, "Differential Pressure Calibrator".
Conair Gatto Catalog entitled, "Profile Sizing Tanks".
RDN Manufacturing Catalog of Model 2.0 PVS.

*Primary Examiner*—Jeffery R. Thurlow
*Attorney, Agent, or Firm*—Brinks Hofer Gilson & Lione

[57] ABSTRACT

A vacuum sizing apparatus and method of cooling and sizing plastic extrusions. In one embodiment the molten plastic extrudate enters a first vacuum chamber, passes into an ambient air environment, and then passes into a second water chamber. The first vacuum chamber includes entry and exit sizing plate manifolds to impart and maintain the size and shape of the plastic extrudate.

17 Claims, 2 Drawing Sheets

VACUUM SIZING APPARATUS AND METHOD OF USING SAME

FIELD OF THE INVENTION

This invention relates generally to a vacuum sizing apparatus and method for cooling molten plastic extrusions to maintain the size and shape of the plastic extrudate as it cools. More particularly, the invention relates to a vacuum sizing apparatus which comprises a combination of water filled vacuum sizing chambers through which the extrudate passes as it cools and hardens.

BACKGROUND OF THE INVENTION

A common method for forming parts from plastic involves the extrusion of material from an extruder. The extruded plastic, or extrudate, however, remains in the molten state immediately upon exiting the extruder. As a result, the extrudate is subject to undesirable deformation until it cools sufficiently to become solid.

Over the years, efforts have been made in the plastics industry to control the size and shape of extruded plastic profiles and extruded plastic tubing as they cool and harden. One widely used method of cooling extruded profiles consists of passing the profile onto an air rack after it exits the extrusion die. Compressed air is directed or blown onto the extrudate to facilitate cooling while the air rack maintains the size and shape of the profile as it solidifies. Another method of maintaining the size and shape of the extruded plastic involves the spraying or cascading of water onto the extrudate after it exits the extruder, or immersing the extrudate in a water bath as it exits the extruder. Spraying and water tanks of this type have been commonly used in the cooling of extruded plastic profiles. However, tanks of this type are often required to be of substantial length to insure that the extrudate is sufficiently cooled and hardened before exiting the tank. As a result, commercially available spraying and water tanks are typically of substantial length, twelve feet or longer, to ensure sufficient cooling.

Typically, alternative methods include passing the extrudate through a sizing and cooling tool or die, which is immersed and contained within a water tank, to help maintain the size and shape of the extrudate as it cools. Effective sizing tools or dies are often quite complex and require precision machining. Often, a sizing tool or die is comprised of a combination of precision machined tapered components which impart the desired size and shape to the extrudate. Various types of sizing or calibrating tools appear in Kessler, U.S. Pat. No. 4,181,487 and Gauchel, U.S. Pat. No. 4,411,613. Due to the precision machining required, effective sizing tools or dies are often quite expensive. Furthermore, sizing tools or dies are often of substantial length, typically six to eight inches or longer.

It is has been found that water in the spraying or water tanks exerts a pressure on the extrudate which can cause unwanted deformation of the extrudate as it cools. Extruded tubing and other hollow extruded articles are particularly susceptible to deformation during the cooling process. To help eliminate the deformation caused by the water in the cooling tanks, it has been found advantageous to place the water under a negative pressure. This has been accomplished through the use of a vacuum pump to create a less than atmospheric pressure in the water of the cooling tank. The vacuum within the cooling tank coupled with the higher pressure within the hollow portion of the extrudate helps to maintain the shape of the extrudate during the cooling process. Sizing tools have also been adapted with vacuum lines to enable vacuum pressure to be applied to the extrudate as it passes through the sizing tool.

Vacuum sizing tanks with complex vacuum pressure control systems have been developed, such as ones disclosed in DeCoursey, U.S. Pat. No. 5,008,051 and Preiato, U.S. Pat. No. 5,340,295, the disclosure of which are herein incorporated by reference. The use of elaborate vacuum sizing tanks with carefully controlled vacuum pressures are particularly useful where precision tubing is involved. However, commercially available vacuum sizing tanks of this type are expensive and of substantial length to accommodate a variety of applications. Furthermore, carefully controlled vacuum pressure is often unnecessary for profile parts and low precision hollow extruded parts.

The above-described water tanks typically consist of an enclosed trough or close-walled tank holding water the entire length of the tank, rendering further modification or manipulation of the extrudate impractical, after it passes through the sizing tool or exits the tank. Vacuum sizing tanks are structurally enclosed to hold the vacuum pressure, which also renders further manipulation or modification of the extrudate after passing through the sizing tool impractical.

Therefore, it is an object to the present invention to provide a versatile vacuum sizing system wherein the vacuum sizing tank is substantially reduced in length, and wherein said apparatus is useful for a variety of applications. It is a further object of the invention to reduce the high cost of lengthy precision machined sizing tools by substantially decreasing the length of the sizing tool or die. It is a further object of the invention to provide a vacuum sizing system wherein the shape of the extrudate can be further manipulated or modified in an ambient air environment after passage through a vacuum sizing tank.

SUMMARY OF THE INVENTION

In accordance with the present invention, an apparatus and method are provided for cooling and sizing a molten plastic extrudate with a first vacuum sizing chamber containing water under vacuum pressure. An entry passage is formed in the chamber to allow the extrudate to enter and an exit passage is formed in the chamber to allow the extrudate to exit the chamber. After passage through the first vacuum chamber, the extrudate passes into an ambient air environment where further manipulation or modification of the extrudate may be performed if desired. The extrudate then passes into a second water chamber where the extrudate is further cooled and solidified.

In a preferred embodiment, the entry passage comprises a sizing plate manifold which is subjected to a vacuum pressure. The exit passage is also comprised of a sizing plate manifold. The entry sizing plate manifold imparts or maintains the size and shape of the extrudate as it enters the vacuum chamber. Similarly, the exit sizing plate manifold also imparts or maintains the size and shape of the extrudate as it exits the vacuum chamber.

The apparatus and method of the present invention may include a first vacuum sizing chamber of substantially reduced length of 12 inches or less and wherein the extrudate enters and exits the first vacuum sizing chamber within 28 inches of the extrusion die. After exiting the first vacuum sizing chamber, the extrudate passes through an ambient air environment and into a second water chamber placed at a variable distance from said first vacuum sizing chamber. Preferably, the extrudate will pass into the second water chamber within 30 inches of the extrusion die.

DETAILED DESCRIPTION OF THE PREFERRED EMBODIMENT OF THE INVENTION

Figure 1:
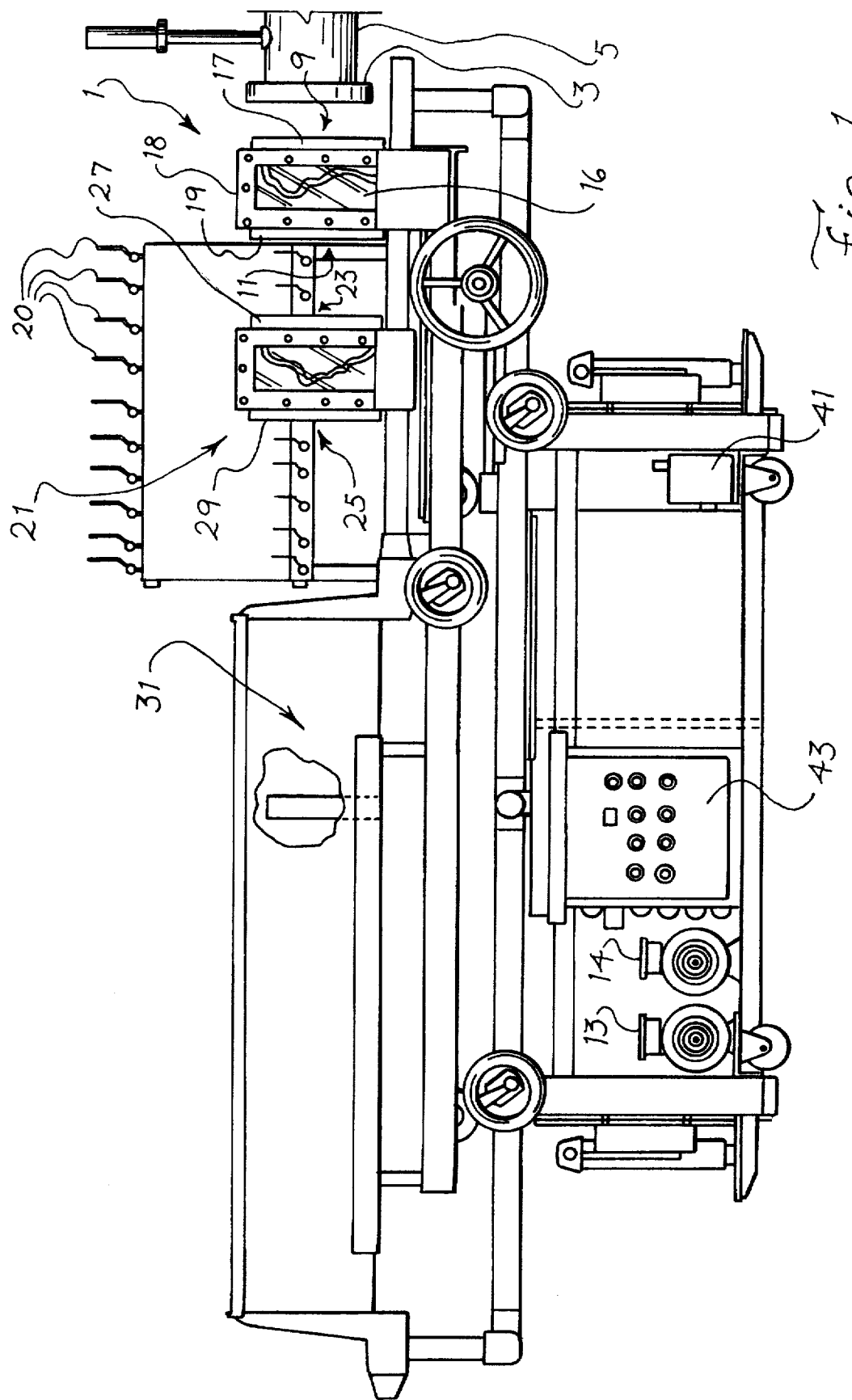
FIG. 1 is a side view of the of vacuum sizing system and associated hardware.
Figure 2:
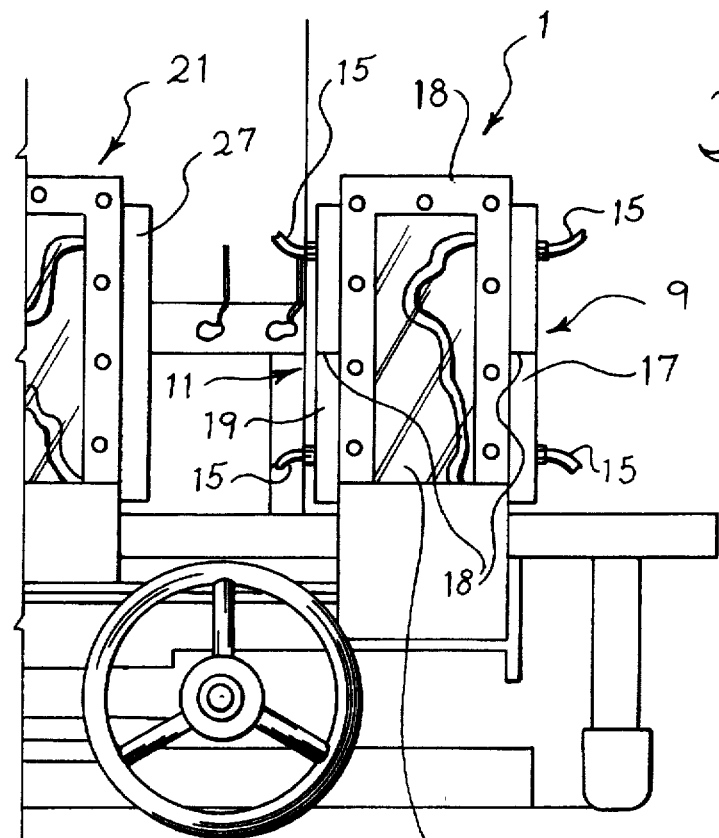
FIG. 2 is side view of the first vacuum sizing chamber.

Referring now to the drawings, FIG. 1 shows a preferred embodiment of vacuum sizing chamber 1 of the present invention. As shown in FIG. 1, vacuum sizing chamber 1 is disposed in line with extrusion die 3 of extruder 5. Any suitable plastic extruder may be used, for example, an extruder with a 24:1 length to diameter ratio may be used. As shown in FIG. 2, vacuum sizing chamber 1 may be constructed of stainless steel and plexiglass. For example, commonly available plexiglass 16 may be enclosed in a 12-gauge stainless steel housing 18 using gaskets to form a watertight seal. In this manner, the extrudate may be visually observed as it passes through the vacuum chamber. An entry passage 9 is formed in vacuum chamber 1 to allow the extrudate from extrusion die 3 to enter and an exit passage 11 is formed in vacuum chamber 1 to allow the extrudate to exit the vacuum chamber. Vacuum pressure is supplied to vacuum chamber 1 by vacuum pump 13 through vacuum lines 15 and controlled by vacuum control valves 20. Vacuum pump 13 may be a 3 horsepower vacuum pump available from any supply house such as McMaster Carr.

Figure 4:
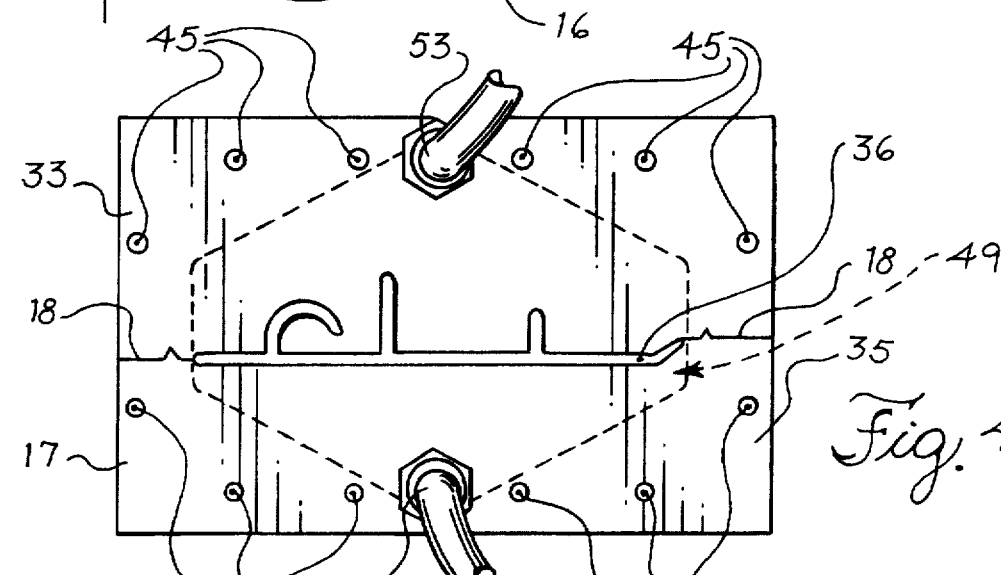
FIG. 4 is a front view of the entry sizing plate manifold of two-piece construction.
Figure 3:
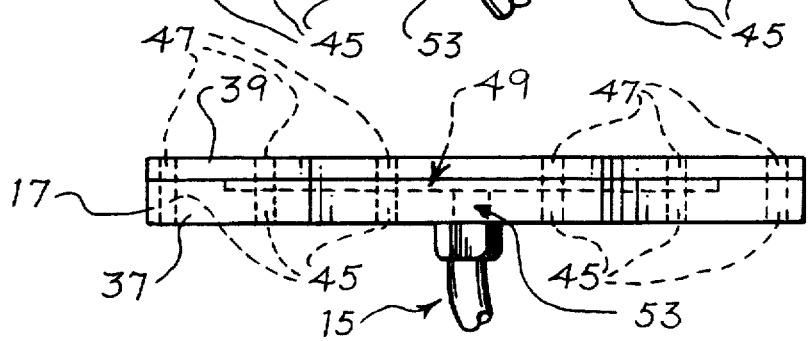
FIG. 3 is a top view of the entry sizing plate manifold.

The entry sizing plate manifold 17 imparts or maintains the size and shape of the extrudate as it enters the vacuum chamber 1. Similarly, the exit sizing plate manifold 19 also imparts or maintains the size and shape of the extrudate as it exits the vacuum chamber 1. As shown in FIGS. 3 and 4, the sizing plate manifolds 17 and 19 may be constructed of a durable material such as aluminum, brass, or stainless steel. Where large runs are anticipated, the durability of stainless steel is preferred.

As shown in FIGS. 3 and 4, entry sizing plate manifold 17 is comprised of an upper section 33 and a lower section 35. In operation, upper section 33 is brought into engagement with lower section 35 at the parting line 18, and defines the extrudate profile 36. Upper section 33 and lower section 35 are both of two-piece construction each comprised of outer section 37 and inner section 39. Sections 37 and 39 are bolted tightly together via bolt holes 45 wherein the inner section 39 has threaded holes 47 to receive a bolt through the bolt hole 45. Inner section 39 and outer section 37 are bolted together to form the unitary upper and lower sections 33 and 35 of entry sizing plate manifold 17.

Additionally, located between inner section 39 and outer section 37, a vacuum area 49, within the dotted line shown in FIG. 4, is provided to allow for the flow of water through the entry sizing plate manifold 17. Vacuum area 49 may be milled from outer section 37 and may have a thickness of 45 thousandths of an inch. Threaded passages 53 are provided for attachment with vacuum lines 15 and to connect vacuum lines 15 with vacuum area 49. In this manner the entry sizing plate manifold may be subjected to a vacuum pressure during operation. The exit sizing plate manifold 19 is constructed and operates in the same manner.

The vacuum pressure applied to the entry and exit sizing plate manifolds acts as a seal to reduce water leakage from the vacuum chamber 1. The vacuum pump 13 used for the first sizing chamber may be used to supply vacuum pressure to the entry and exit sizing plate manifolds 17 and 19. It may be desirable to use a second vacuum pump 14 for this purpose as an added precaution in the event vacuum pressure is lost in the first vacuum sizing chamber 1.

As shown in FIG. 3, the entry sizing plate manifold 17 provided in the present invention may be of substantially reduced thickness relative to the initial sizing tool typically used in water or vacuum sizing tanks. The entry sizing plate manifold 17 may have, for example, a thickness of 2 inches or less which would not require the type of complex precision machining associated with typical sizing tools of longer length. Similarly, the exit sizing plate manifold 19 may also be of reduced thickness, with a thickness of two inches or less. Although as depicted in FIGS. 3 and 4, the entry sizing plate manifold 17 is comprised of four separate parts, it may also be of a one or two part construction or made up of more than four parts.

In operation, upper section 33 is brought into engagement with lower section 35 at the parting line 18. In this manner, the parting lines 18 of the sizing plate manifold are closed over the extrudate to maintain and impart size and shape to the extrudate. Typically, no gasket is necessary for the parting line 18, but teflon sealant may be used to eliminate any unwanted leakage. In addition, Foam rubber gaskets may be used between the sizing plate manifolds 17 and 19 and the vacuum chamber housing 18 to form a watertight seal.

The vacuum chamber 1 may be of a substantially reduced length, for example, twelve inches or less. The temperature of the water in vacuum chamber 1 is preferably between 40 and 120 degrees Fahrenheit. However, the present invention contemplates the use of hot water in some instances. In such instances the vacuum chamber 1 may be filled with hot water with a temperature preferably between 90 and 120 degrees Fahrenheit. The use of hot water and the substantially reduced length of vacuum chamber 1 allow for further manipulation or modification of the extrudate after it passes through the exit sizing plate manifold 19. By passing the extrudate through hot water, it is cooled to a lesser extent than if the vacuum chamber were filled with cold water. As a result, the extrudate is more pliable and subject to manipulation upon exiting the vacuum chamber 1 and internal stress and cracking are reduced. Where extruded profiles are involved, the ability to further manipulate the profile after it exits the initial sizing tool or vacuum chamber is particularly desirable. Typically, to effectively manipulate the profile, the manipulation must take place within 28 inches from the extrusion die 3. In one embodiment of the present invention, the use of a hot water filled vacuum chamber 1 of substantially reduced length, in combination with comparatively thin entry and exit sizing plate manifolds 17 and 19, allows for further manipulation of the part within 28 inches of the extrusion die. In applications where hot water is desired, the present invention is equipped with a commonly available submersible heating element 41 which can be preset to a desired temperature on control panel 43. Applications using hot water in the first vacuum chamber 1 work particularly well where the extrudate is acrylic.

In this manner, an extruded plastic part with a profile including an angle of, for example, 20 degrees can be formed. In conventional extrusion systems, a profile leaving the extrusion die with a 20 degree angle would typically deform onto itself. To produce the desired 20 degree profile in such systems, the extrusion die might impart a 45 degree angle and the extrudate would then be manipulated to enter the initial sizing tool at the desired angle. Using the present invention, however, the 20 degree angle could be imparted to the profile after it exits the vacuum sizing chamber where it can be more easily and precisely manipulated.

After passing through the first vacuum chamber 1, the extrudate passes into an ambient air environment where further manipulation or modification to the shape of the extrudate can be performed. At this point, the extrudate is subjected to the ambient air where direct heat transfer to the ambient air, as well as evaporation of any water adhering to the extrudate, occurs to further dissipate heat. It will be appreciated that such an ambient air environment could be enclosed and that air or water could be blown or sprayed onto the extrudate to facilitate cooling. The extrudate is then passed into a second water chamber 21. There is an entry passage 23 formed in the second water chamber 21 to allow the extrudate to enter, and an exit passage 25 formed in the second water chamber 21 to allow the extrudate to exit the chamber. The water chamber 21 may include entry and exit sizing plate manifolds 27 and 29 which are of reduced thickness. The entry passage 23 may be comprised of a sizing plate manifold 27 which is subjected to a vacuum pressure via vacuum lines 15. The exit passage 25 may also be comprised of a sizing plate manifold 29 which may be subjected to a vacuum pressure via vacuum lines 15.

The entry sizing plate manifold 27 maintains the size and shape of the extrudate as it enters the water chamber 21. Similarly, the exit sizing plate manifold 29 also maintains the size and shape of the extrudate as it exits the water chamber 21. The vacuum pressure that may be applied via vacuum lines 15 to the entry or exit sizing plate manifold acts as a seal to reduce water leakage from the water chamber.

The second water chamber 21 may be filled with cold water, less than 90 degrees Fahrenheit, to further cool and solidify the extrudate. This water chamber 21 may also be subjected to a vacuum pressure where desired. The second water chamber 21 can also be of substantially reduced length, and may be movable relative to the first vacuum sizing chamber to provide a variable distance between the chambers. In this manner, a cooling and sizing system is provided which can be adapted for a variety of applications. The second water chamber 21 may be constructed in the same manner as vacuum sizing chamber 1. The extrudate may pass from the second water chamber 21 into a final cooling tank 31 or the second water chamber 21 may be a subchamber of final cooling tank 31. After exiting the second water chamber 21, the extrudate may enter final cooling tank 31 which may be a conventional water tank of substantial length if desired.

In accordance with the present invention, a vacuum cooling and sizing system is provided with a vacuum sizing chamber of substantially reduced length. The need for expensive lengthy high-precision machined sizing tools is eliminated through the use of a combination of water chambers and thin entry and exit sizing plate manifolds. The present invention may also allow for further manipulation or modification to the shape of the extrudate after it exits the vacuum sizing chamber.

The present invention is quite versatile and can be adapted for a variety of applications. The present invention can be utilized with extrusion grade plastics including polyethylene, polypropylene, PVC, polystyrene, polyurethane, acrylic, acrylonitrile butadiene styrene (ABS), and Norel.

I claim:

1. An apparatus for cooling and sizing molten plastic extrudate after it exits an extrusion die, comprising:

a first water chamber containing water under vacuum pressure, wherein said first water chamber is disposed to receive the extrudate after said extrudate exits said extrusion die and where said first water chamber is no more than twelve inches in length;

an entry passage for the molten plastic extrudate into said first water chamber wherein said entry passage to said first water chamber comprises an entry sizing plate manifold having a thickness of no more than two inches, and wherein said entry sizing plate manifold is subject to a vacuum pressure;

an exit passage from said first water chamber for the plastic extrudate for passage of the extrudate into an ambient air environment as the extrudate exits said first water chamber, wherein said exit passage comprises an exit sizing plate manifold having a thickness of no more than two inches, wherein said exit sizing plate manifold is subjected to a vacuum pressure;

and wherein there are no sizing or calibration plates positioned between said entry and exit sizing plate manifolds.

2. The apparatus of claim 1 wherein the exit passage of said first water chamber is located at a distance of 28 inches or less from said extrusion die to allow for further manipulation of the shape of said extrudate as said extrudate passes into said ambient air environment.

3. The apparatus of claim 1 wherein the length of said first water chamber is of substantially reduced length to allow said extrudate to exit said first water chamber within 28 inches of said extrusion die.

4. The apparatus of claim 1 further including a second water chamber containing water, disposed in line with said first water chamber, including an entry passage for the extrudate after it passes through said ambient air environment; wherein the entry passage of said second water chamber is located within 30 inches of said extrusion die.

5. The apparatus of claim 2 including a means for heating the water in said first water chamber to a temperature of between 90 and 120 degrees Fahrenheit.

6. The apparatus of claim 4 wherein said second water chamber is movable relative to said first water chamber to provide a variable distance between said chambers.

7. The apparatus of claim 4 wherein said second water chamber contains water under vacuum pressure and has a length of no more than twelve inches and wherein said entry passage of said second water chamber comprises an entry sizing plate manifold that is subject to a vacuum pressure and having a thickness of no more than two inches.

8. The apparatus of claim 7 wherein said second water chamber further includes an exit passage comprising an exit sizing plate manifold that is subject to vacuum pressure and having a thickness of no more than two inches.

9. An apparatus for cooling and sizing molten plastic extrudate after it exits an extrusion die, comprising:

a first water chamber containing water under vacuum pressure, said first water chamber having a length of no more than twelve inches, wherein said first water chamber is disposed to receive the extrudate after said extrudate exits said extrusion die;

an entry passage into said first water chamber for the molten plastic extrudate, said entry passage comprising an entry sizing plate manifold subject to a vacuum pressure and having a thickness of no more than two inches;

an exit passage from said first water chamber for the plastic extrudate for passage of the extrudate into an ambient air environment as the extrudate exits said first water chamber; said exit passage comprising an exit sizing plate manifold subject to vacuum pressure and having a thickness of no more than two inches; wherein there are no sizing or calibration plates positioned between said entry and exit sizing plate manifolds; and said exit passage is located at a distance of 28 inches or less from said extrusion die;

a second water chamber containing water and disposed in line with said first water chamber, said second water chamber including an entry passage for the extrudate after the extrudate passes through said ambient air environment; and wherein said entry passage of said second water chamber is disposed a distance of no more than 30 inches from said extrusion die.

10. The apparatus of claim 9 wherein said second water chamber is movable relative to said first water chamber to provide a variable distance between said chambers.

11. A method of cooling and sizing molten plastic extrudate after said extrudate exits an extrusion die, comprising the steps of:

passing said molten plastic extrudate into a first water chamber containing water under vacuum pressure; said first water chamber disposed to receive the extrudate after said extrudate exits said extrusion die and said first water chamber having a length of no more than twelve inches; said first water chamber further including an entry passage for the extrudate into said first water chamber and an exit passage for the extrudate out of said first water chamber, where said entry and exit passages of said first water chamber each comprise a sizing plate manifold subject to vacuum pressure, and where each of said entry and exit sizing plate manifolds have a thickness of no more than two inches; and wherein there are no sizing or calibration plates positioned between said entry and exit sizing plate manifolds;

passing said extrudate out of said first water chamber into an ambient air environment;

passing said extrudate from said ambient air environment into a second water chamber having an entry passage for said extrudate.

12. The method of claim 11 wherein said exit passage is located at a distance of 28 inches or less from said extrusion die and said entry passage of said second water chamber is disposed at a distance of no more than 30 inches from said extrusion die.

13. The method of claim 11 wherein the length of said second water chamber is no more than twelve inches.

14. The method of claim 13 wherein said second water chamber includes an entry passage for the extrudate into said second water chamber and an exit passage for the extrudate out of said second water chamber, where said entry and exit passages of said second water chamber each comprise a sizing plate manifold subject to vacuum pressure.

15. The method of claim 14 wherein said entry and exit sizing plate manifolds of said second water chamber have a thickness of no more than two inches.

16. The method of claim 11 further including the step of heating the water in said first water chamber to a temperature greater than 90 degrees Fahrenheit to allow for manipulation of the extrudate after said extrudate passes through said first water chamber.

17. The method of claim 11 wherein the temperature of said extrudate after it exits said first water chamber is such that the shape of said extrudate is capable of being manipulated in said ambient air environment after exiting said first water chamber.

* * * * *